United States Patent [19]

Butler et al.

[11] 4,357,709

[45] Nov. 2, 1982

[54] APPARATUS FOR REGENERATING SIGNALS WITHIN A FREQUENCY BAND

[75] Inventors: Michael B. N. Butler; Walter W. Jacobs; Peter M. Grant, all of Edinburgh, Scotland

[73] Assignee: Racal-Mesl Limited, Scotland

[21] Appl. No.: 204,672

[22] Filed: Nov. 5, 1980

[30] Foreign Application Priority Data

Nov. 12, 1979 [GB] United Kingdom ................. 7939108

[51] Int. Cl.[3] ........................... H04K 3/00; H04B 7/14

[52] U.S. Cl. ............................... 455/20; 343/17.2 PC; 343/18 E; 455/1

[58] Field of Search .......................... 455/1, 18, 20, 21; 343/18 E, 17.2 PC; 370/50, 70, 75

[56] References Cited

U.S. PATENT DOCUMENTS 3,600,685 8/1971 Doyle ................................ 343/18 E 3,955,200 5/1976 Miller ................................ 343/18 E

FOREIGN PATENT DOCUMENTS 1046923 10/1966 United Kingdom .

1278771 6/1972 United Kingdom .

1450761 9/1976 United Kingdom .

1538509 1/1979 United Kingdom .

*Primary Examiner*—Marc E. Bookbinder

*Attorney, Agent, or Firm*—Sughrue, Mion, Zinn, Macpeak & Seas

[57] ABSTRACT

Apparatus for generating signals to interfere with or jam signals detected as unfriendly in a given input frequency band comprises a spectrum analyzer circuit using surface acoustic wave (SAW) chirp filters to provide a transformation of input frequency signals to a series of time displaced signals in a linear frequency-to-time relationship. The analyzer circuit uses the SAW devices to perform multiply-convolve functions that separate the different frequency signals in time and the analyzer is repetitively triggered to perform a spectrum analysis. The time series signals are selectively applied to a frequency synthesizer having a time-to-frequency relationship that matches the analyzer characteristic so as to regenerate signals at the input frequencies. The synthesizer uses two matched chirp filters one activated by a fixed time signal and the other by the time series to generate swept frequencies that are mixed to provide the required frequency outputs. The time series is processed to inhibit those signals corresponding to frequencies identified as friendly. In an alternative synthesizer the time series signals are converted to frequency-representing digital codes which are applied to a programmable frequency generator. Signal processing to protect friendly frequencies is performed on the digital codes.

21 Claims, 4 Drawing Figures

APPARATUS FOR REGENERATING SIGNALS WITHIN A FREQUENCY BAND

FIELD OF THE INVENTION

This invention relates to apparatus for regenerating signals within a given frequency band. The invention has particular, though not exclusive, application to the regeneration of selected signals within the frequency band.

A specific application of the invention is in electronic countermeasures requiring the provision of a regenerated signal in response to the detection of a signal in a monitored input bandwidth, which signal is not identified as friendly. In such applications the detected signal may be changing in frequency and thus it is generally desirable to be able to follow or track this signal as accurately and as quickly as possible.

BACKGROUND TO THE INVENTION

One area of application of electronic countermeasures is the interception and selective interference with communications traffic. A portion or band of spectrum is monitored to ascertain which channels are carrying communications traffic, and after identifying signals on frequencies which are designated as friendly, a signal regenerator, that is a transmitter device, is activated on the frequencies of the unfriendly signals with the object of interfering with and disrupting the communications on those frequencies.

Current equipment for performing the above function predominately uses superheterodyne receivers which are swept, continuously or in steps, across the band of interest. Such equipments do not offer the capability of quickly intercepting and identifying when a new transmitter switches on nor do they possess a capability to track or follow signals which are changing in frequency.

British patent specification No. 1,046,923 (Compagnie Francaise Thomson-Houston) shows one example of a swept receiver technique in which the monitored frequency range is swept with the aid of a wobbulator whose sweep is stopped at each non-friendly signal identified and whose instantaneous frequency is then used as a source for a transmitter jamming signal on that frequency. The sweep then recommences to look for the next signal to be jammed. This procedure is inherently slow, since the sweep is interrupted for each jamming transmission. In practice the number of input signals that can be handled is very restricted as the specification itself makes clear.

British patent specifications Nos. 1,278,771 and 1,450,761 (both to Siemens) disclose alternative approaches which do not have the disadvantage above-mentioned but involve complex systems and are still only capable of relatively slow operation to cover the whole bandwidth as is necessary for transmissions that may be frequency agile. Specification No. 1,278,771 uses a complex arrangement of switchable frequency converters to divide the input band into successively examined segments each segment being finally resolved into channels by a large number (e.g. 125) of filter/detector units. Specification No. 1,450,761 divides the input bandwidth up by separately tuned filters required to be maintained in alignment across the whole frequency band in question.

Reference will be made hereinafter to the adoption of a particular transformation technique. The use of transform methods as such is known. One example is Sony's British specification No. 1,538,509 which uses a particular transform technique to reduce noise in a single input video signal. The particular transform used depends on a priori assumptions of the nature of the input signal and is not considered to have any relevance to electronic counter-measures of the kind with which the invention is concerned.

SUMMARY OF THE PRESENT INVENTION

The present invention provides apparatus for regenerating signals within an input frequency band comprising a spectrum analyzer circuit, a signal regenerator circuit and timing means for timing the operations of the analyzer and regenerator circuits.

The spectrum analyzer circuit is repetitively triggerable to transform on each such triggering a set of signals mutually displaced in frequency within a predetermined frequency band to a corresponding series of signals mutually displaced in time according to a predetermined frequency-to-time relationship. The signal regenerator circuit is arranged to receive a series of time-displaced signals from the analyzer circuit to provide a set of frequency signals in accord with a predetermined time-to-frequency relationship that so matches the frequency-to-time relationship of the analyzer circuit that the same frequency differences exist between a set of signals from the regenerator circuit as existed between the set of signals that gave rise thereto in the input frequency band of the analyzer circuit. The timing means, for example a clock source, is coupled to the analyzer circuit to supply thereto triggering signals and to the regenerator circuit to provide time reference signals therefor.

The apparatus may be advantageously realised, and particularly the analyzer circuit, with the use of surface acoustic wave (SAW) devices which may be constructed to achieve wide bandwidths and fast responses.

The analyzer circuit may be realised in the form of a first chirp device for generating a swept frequency in response to a trigger signal; a mixer for receiving signals in the input frequency band and connected to the first chirp device to mix (multiply) the input signals with the swept frequency signal to provide a corresponding set of swept signals at an intermediate frequency band; and a second chirp device responsive to the swept frequency signals at the intermediate frequency to perform a convolution operation thereon and provide a corresponding set of compressed pulses displaced in time in accordance with the predetermined frequency-to-time relationship. In particular the chirp devices are preferred to be surface acoustic wave chirp filters.

The multiply-convolve function performed with the aid of the chirp devices above-mentioned may be part of a more complex function performed on the input signals, e.g. multiply-convolve-multiply or convolve-muliply-convolve, the latter being applicable only to pulsed input signals.

The signal regeneration circuit is presently contemplated as being realised in two ways, one of which preferably uses SAW devices.

In one implementation, the circuit includes a synthesizer circuit that comprises two chirp devices having the same magnitude of dispersive slope one of which is activated to generate a respective frequency signal at a time fixed with respect to each trigger signal applied to the analyzer circuit, for example by supplying the trigger signal as a reference through a delay circuit. The other chirp device is activated by each of a series of time displaced signals obtained from the analyzer circuit. This series may have been processed to inhibit the transmission to the synthesizer of signals which are at times corresponding to frequencies identified as friendly. The other chirp device generates a series of swept frequency signals and each at least partially coexisting in time with that from the one chirp device. The signals from the chirp devices are mixed (multiplied) in a mixer to provide a set of signals at the mixer output having different but individually constant frequencies. A filter is then used to select this desired set of signals at the mixer output. For example if the two chirp devices, which are preferably SAW chirp filters, have dispersive slopes of opposite sign the sum products are selected at the mixer output.

In a second implementation of the regenerator circuit, the series of signals from the analyzer circuit are applied to a time-measuring means by which they are converted to digital codes representing time and thus frequency. The digital codes are then applied to a programmable frequency generator to produce the output frequencies. It will be appreciated that the combined time-to-code and code-to-frequency conversion has to be in accord with the required time-to-frequency relationship. In this case signal processing to inhibit regeneration on friendly frequencies can be applied to the digital codes.

In both implementations the signals from the synthesizer or generator need not be at the same frequencies as the input signals providing the required frequency relationship is observed. The output frequency band can be shifted and/or inverted by conventional heterodyning techniques to give the wanted output frequency spectrum.

The aforementioned signal processor may include a data store storing data defining selected frequencies within the input bandwidth on which regenerated signals are not to be emitted, e.g. frequencies on which friendly signals are expected, and the processor is operable to transmit the set of signals produced by the analyzer other than those corresponding to the selected frequencies.

The spectrum analyzer is conveniently arranged to repetitively sample the input frequency band deriving a set of time displaced signals for each sampling operation; such sampling occurs with the use of multiply-convolve techniques. The regenerator operation may be timed to interleave or alternate with the sampling to avoid a condition known as lock-up due to feedback from output to input.

Each sampling by the analyzer may be initiated by a clock pulse providing a reference against which the signals emerging from the analyzer are timed. Consequently the processor may store frequency data as a set of reference times in the form of a time "template" referred to the clock pulse and specifying those times for which the analyzer signals are not to be transferred to the synthesizer. Thus in the first implementation of the regenerator circuit outlined above, by controlling a gate for transmission of pulses from the analyzer to the synthesizer in accordance with the template only the desired signals are regenerated.

In order that the invention may be better understood, embodiments of follower/regenerator apparatus according to the invention will be described with reference to the accompanying drawings.

DESCRIPTION OF THE PREFERRED EMBODIMENT

Figure 1:
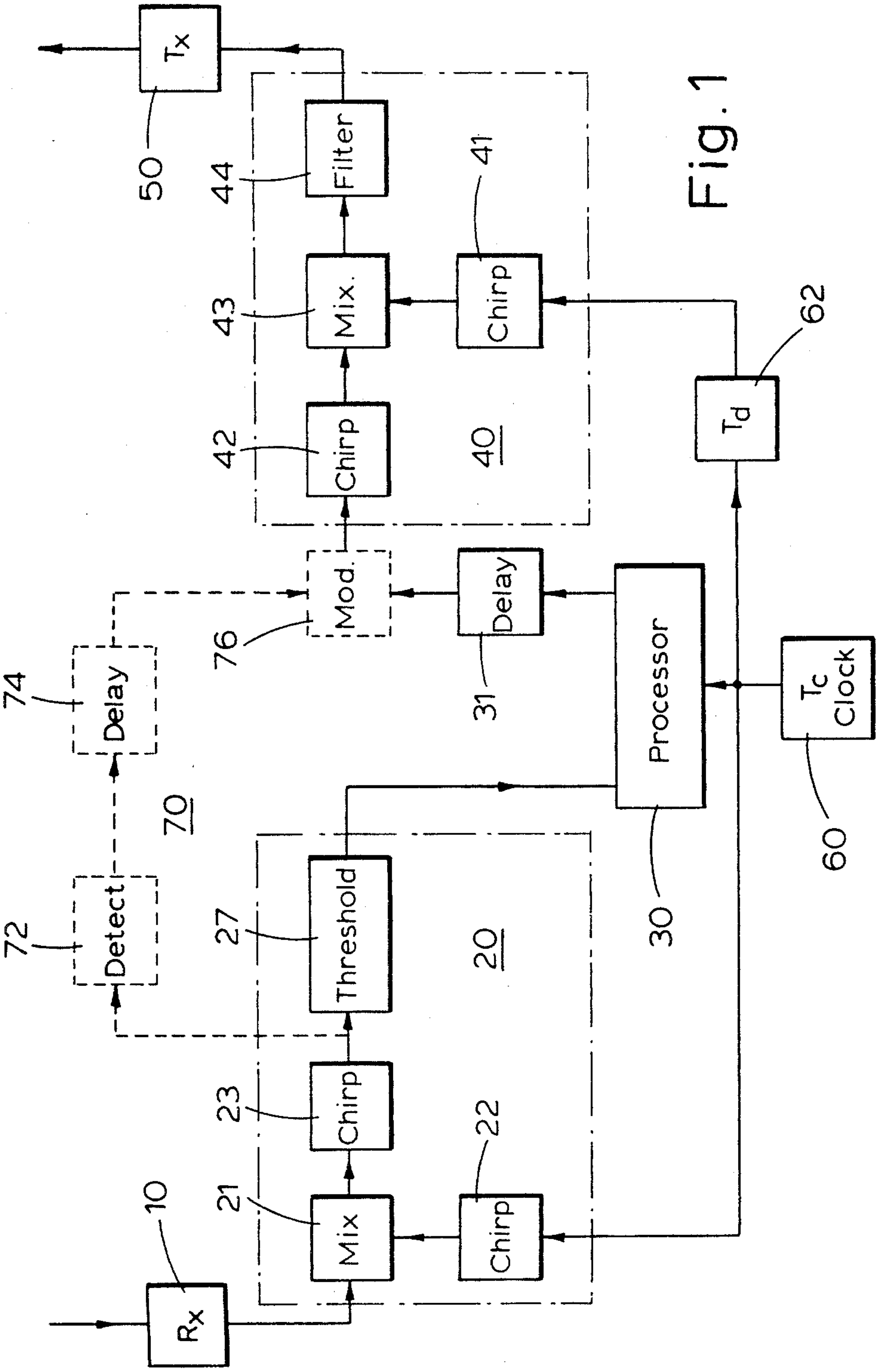
FIG. 1 illustrates in block diagram form a follower/regenerator apparatus in accordance with this invention.

Referring to FIG. 1, the illustrated apparatus comprises an input receiver circuit 10 that is connected to an antenna to receive radio frequency signals and, if required, to translate them to a suitable intermediate frequency (IF); a spectrum analyzer circuit 20 that transforms signals in the selected input frequency band to corresponding set of signals displaced in time according to a linear frequency-to-time relationship; a processor unit 30 that contains a stored table of frequencies identified as friendly or an equivalent temporal version of same and issues regeneration command signals in respect of other signals; a synthesizer circuit 40 that is responsive to these command signals to transform them into output signals having the same frequency relationships as the input signals to which they correspond; and output transmitter circuit 50, including if necessary mixer circuitry for translating the output signals to the desired portion of the R.F. spectrum, for feeding signals to the input antenna or a separate antenna for radiation as regenerated signals at the selected input frequencies. The operation of the analyzer, processor and synthesizer circuits 20, 30 and 40 are timed by a master clock 60.

The analyzer circuit 20 comprises a mixer (multiplier) 21 to which is applied signals lying within an input frequency band obtained from the receiver 10. The input signals are mixed with the output of a chirp device 22 pulsed by the clock 60 at intervals $T_c$, where $T_c$ is the clock period.

The chirp device 22 includes a chirp filter (which is readily realised in SAW technology) that is impulsed to provide a swept frequency output to the mixer 21. This is a continuous uninterrupted sweep. The output sweep of the filter will depend on the chirp duration (T) and the dispersive slope ($\mu$) of the filter, which is the rate of frequency sweep. Either an up-chirp or a down-chirp (sweeps of increasing or decreasing frequency) may be employed. At the output of the mixer the spectrum of input frequencies is correspondingly swept at an intermediate frequency (I.F.). If the sum frequency component is selected the sweep will be in the same sense as that of device 22. If the difference frequency is selected the sense may be inverted depending on the input frequency relationship of the mixer. A chirp filter 23 is designed to produce a convolution operation on the selected I.F. component and thus has the opposite sweep sense to that of the selected mixer output component. It also has the same magnitude dispersive slope as device 22 but is of opposite sign. It will be assumed for explanation that the device 22 produces a linear up-chirp and that the spectrum at the mixer output is swept in the same sense. Filter 23 thus has a linear down-chirp response. The operation of the circuit will be explained with reference to FIG. 2.

Figure 2:
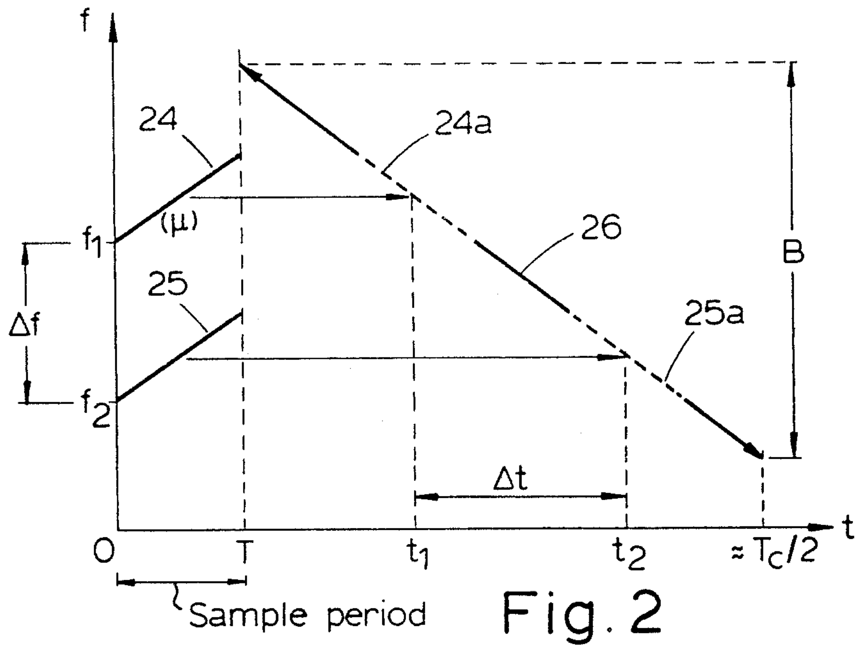
FIG. 2 is a frequency/time diagram relating to the operation of the input analyzer of FIG. 1.

At the time of a clock pulse, which is the zero on the time axis (abscissa) in FIG. 2, two input signals, as translated at the output of the mixer, are swept upwardly from respective base frequencies $f_1$, $f_2$ (at I.F.) to $(f_1+\mu T)$ and $(f_2+\mu T)$ as indicated by full line segments 24, 25. These signals are simultaneous. The input signals themselves are assumed to be of fixed frequency during the time interval T which also defines the analyzer window or time when the input is sampled.

The down-chirp response of filter 23 is shown by the line 26. The bandwidth of the filter accommodates both the input signals 24 and 25 and as they propagate through the filter they interact with the filter as indicated by dashed line segments 24a and 25b to provide respective compressed output pulses at the times $t_1$ and $t_2$. Consequently the input signals appear at the output of filter 23 having had their frequencies linearly transformed into time delay with respect to the clock pulse so that the frequencies are resolved into a time series.

The input bandwidth that the analyzer is capable of handling depends on the bandwidth B of the filter 23. It will be readily seen that the input bandwidth B is essentially the bandwidth of filter 23 less the chirp bandwidth $\mu T$.

The analyzer operation described above is completed within about half the clock period $T_c$. This is not itself critical though as will become apparent in the later description, the sample period T has to satisfy certain constraints for best operation.

In summary, therefore, at each clock pulse the input bandwidth is sampled to transform the then existing set of simultaneous input signals into a series of time signals which represent the frequency spectrum of the input. These signals can be successively processed to determine for which ones a corresponding regenerated output signal is to be provided. Before such processing in the processor unit 30 the output signals of the filter 23 are detected in a detector 27 which provides appropriate standard pulses to the unit 30. Detector 27 may include threshold circuitry to produce pulses only for signals exceeding a given amplitude.

The analyzer is operative to sample continuous wave (CW) input signals or pulsed signals with sample periods of duration T. The sampling of a pulsed signal may be relatively complex depending on both the pulse repetition frequency and pulse length relative to the sample period $T_c$ and the sample time T.

The compression performed by the convolution operation in filter 23 provides a processing gain enabling detection of signals close to the noise level in the apparatus. Furthermore the standard pulses obtained after threshold detection are free of input noise and thus provide clean signals from which to derive a set of regenerated frequency signals. For optimum convolution, the input signals should be of essentially constant frequency during the sampling interval T. Signals of continually varying frequency can be accommodated if the rate of change is slow in relation to the sample time T. Additionally the accuracy with which a continually varying frequency signal or a freuency hopped signal can be followed depends on the rate of sampling, e.g. on the sampling interval $T_c$.

The processor unit 30 is designed to provide a real time analysis of the signals exiting from the analyzer 2. The unit 30 includes a digital processor unit that with the aid of a data store storing a table of frequencies (or corresponding times relative to the sampling clock pulse) makes a decision as to which detected signals are to be regenerated. The digital processing techniques are within the compass of those in the art and will not be described here.

The storage of wanted and unwanted frequencies for regeneration is conveniently done by means of a time "template" defining these frequencies. The time template is used to control a transmission gate for the pulses. The template may be realised with the aid of a digital counter having a preselected set of count values defining the template, and the transmission gate controlled in dependence on the instantaneous count value in the counter started by the clock pulse. By controlling the count rate the resolution of the processor is made as fine as desired. Each signal selected by unit 30 for regeneration results in a command pulse from unit 30 that is applied to synthesizer 40 via a delay unit 31 about which more is said below.

The synthesizer 40 comprises two chirp devices 41 and 42 that feed a mixer (multiplier) 43. The chirp device 41 is impulsed by pulses derived from clock 60 but delayed with respect thereto by means of a delay unit 62. The delay, which is denoted $T_d$, is about half the clock period $T_c$ in the case under discussion. Device 41 generates a short duration swept frequency waveform for each delayed clock pulse thereto from unit 62.

Figure 3:
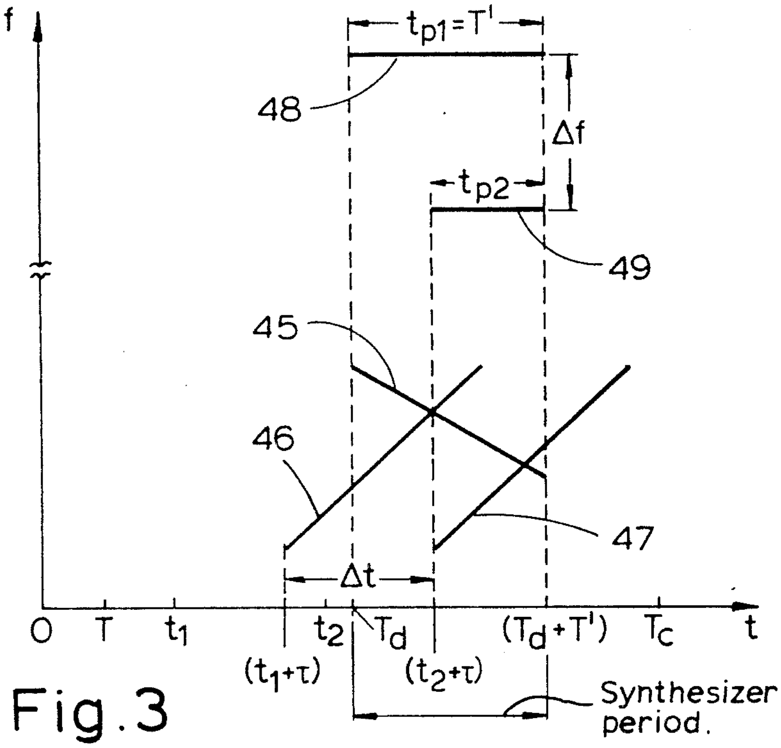
FIG. 3 is another frequency/time diagram relating to the operation of the output synthesizer of FIG. 1.

The operation of the synthesizer 40 will be further described with reference to FIG. 3 which shows a complete clock interval $T_c$ with the same time zero as for FIG. 2. For explanatory purposes it will be assumed the two frequency signals $f_1$ and $f_2$ converted into analyzer outputs at $t_1$ and $t_2$ are to be regenerated by the synthesizer. FIG. 3 shows the chirp filter 41 to be impulsed at the time $T_d$ in each clock period so as to produce a linear down-chirp 45 of duration T', which may be selected to equal T the analyzer chirp. The pulses $t_1$, $t_2$ generated in the analyzer are each delayed by a time $\tau$ and the delayed pulses are applied to the chirp filter 42 at times $(t_1+\tau)$ and $(t_2+\tau)$ respectively to produce linear up-chirps 46 and 47 respectively of relatively long duration, $T''>T'$. The delay $\tau$ is the total delay due to processing in unit 30 and the delay effected by delay device 31 (the unit 76 can be ignored for the present). It will be noted that the impulsing of the chirp filter 42 starts before the time series of pulses from the analyzer is complete, e.g. $(t_1+\tau)$ is earlier than $t_2$. However, an output is only obtainable during the time of chirp 45. This period, $T_d$ to $T_d+T'$, may be called the "synthesizer period."

The characteristics of the chirp filters 41 and 42 are such that they have dispersive slopes ($\mu$) of equal magnitude but of opposite signal. The linear swept frequency signals are applied to a mixer 43 from which the sum component is extracted by a wide band filter 44. The instantaneous frequency of any given chirp waveform from filter 42 added to that from filter 41 is constant for the time that the waveforms co-exist and its value is dependent on the start time of the former waveform relative to that of the latter synchronized to the clock at $T_c$, i.e. in general for a pulse generated at time t in the clock period the sum frequency is given by:

$$F-\mu(t+\tau-T_d),\ \text{for}\ t>T_d\ \text{and} \qquad (1)$$

where F is the sum of the start frequencies of the chirps from filters 41 and 42.

Consequently in response to the delayed pulse $(t_1+\tau)$ there is produced a constant sum frequency pulse 48 of duration $t_{p1}$ whose duration equals T' since the chirp 45 lies entirely within chirp 46. The chirp 47 produces a constant frequency pulse 49 whose duration $t_{p2}$ is shorter, being equal to the time that waveforms 47 and 45 co-exist.

Looking at both FIGS. 2 and 3, it is seen that the input frequencies $f_1$ and $f_2$ have been regenerated as pulses 48 and 49 respectively. The arrangement described has regenerated pulse 48 higher in frequency than pulse 49 in conformity with $f_1$ being greater than $f_2$ but the essential requirement is that the frequency differences among signals of the output frequency spectrum from mixer 43 be the same as those of the input frequency spectrum to mixer 21.

The frequency difference $\alpha f$ between the input frequencies $f_1$ and $f_2$ produces an interval $\Delta t$ between the pulses $t_1$, $t_2$ given by:

$$\Delta t = \Delta f / |\mu|,$$

where $|\mu|$ is the dispersive slope of the chirp filters in FIG. 2.

The value $\Delta t$ is retained between the delayed pulses $(t_1+\tau)$, $(t_2+\tau)$ in the synthesizer and as the same relationship given above applies to regenerating the original frequency difference $\Delta f$, it follows that $|\mu|$ for the synthesizer chirp filters must be the same as that for the analyzer chirp filters.

It is not essential that pulses 48 and 49 be regenerated at frequencies $f_1$ and $f_2$ though it may be convenient to choose the chirp filter parameters to that end. Provided the frequency differences are maintained the output frequency spectrum can be translated to provide the desired equality of absolute frequency values between the signals received by input stage 10 and those radiated by output stage 50.

From FIGS. 2 and 3 it will be noted that within a given clock period, certain procedures in the synthesizer and analyzer may overlap to some extent. It is noted, however, that the sample period when the input is open and the synthesizer period when the output is generated have no overlap in time, so that sample and synthesizer periods are alternating over a succession of clock cycles. There is an advantage to this procedure in that if both input and output of the apparatus were to be simultaneously active, coupling between output stage 50 and input stage 10 could lead to a self-sustaining feed-back loop being established, a condition known as lock-up. This possibilty is avoided by ensuring that the analyzer input and synthesizer output operate alternately, a condition known as operating in a look-through mode.

FIG. 3 shows how two inputs present during the analyzer portion of the clock period $0 \rightarrow T_c$ generate a corresponding output from the synthesizer during the latter half of the same period. In practice this requires chirp filters 22 and 41 both to have short durations compared to the period of the masterclock, i.e. $T°T' \leqq T_c/2$. When the timing is arranged to avoid overlapping of the responses from chirp filters 22 and 41 the apparatus can be operated such that both an input analysis and output synthesis period can occur during each period of the masterclock.

A fine adjustment to obtain exact coincidence between input and output frequencies can be achieved by adjustment of the parameters in the expression (1) for the output frequency given above of which the delays $\tau$ and $T_d$ provided by the units 31 and 62 are susceptible to adjustment.

It may also be desirable to regenerate amplitude information on the output signals. The convolved pulses emerging from filter 23 in the synthesizer have amplitudes dependent on the amplitudes of their respective input signals. The amplitude information is discarded in the threshold detector 27 from which standard pulses are obtained. To retain amplitude information the additional circuit 70 shown in phantom may be added. This comprises an envelope detector 72 for the compressed pulses, a delay unit 74, and a pulse-amplitude modulator 76, e.g. a voltage controlled attenuator device, inserted between the delay unit 31 and the synthesizer 40. The delay in unit 74 is approximately that of unit 31 and is adjusted such that each standard pulse emerging from unit 31 is modulated according to the amplitude of the compressed pulse that gave rise to it. The output pulse from synthesizer 40 is then generated with an amplitude corresponding to the input signal amplitude giving an automatic adjustment of the apparatus gain.

The apparatus of FIG. 1 has been described in general terms. It may be realised in practice by use of SAW technology for the chirp filters. Such technology is well known and need not be described in detail. The use of SAW filters in spectrum or Fourier analysis is described in a paper entitled "Development and Application of SAW Chirp-Z transformer" by M. B. N. Butler, published in AGARD Conference Proceedings No. 230, Paper 5.1. The spectrum analyzer described uses a multiply-convolve variant of the chirp transform algorithm. It may also be realised with the aid of a convolve-multiply-covolve (CMC) chirp transform such as described by C. Lardat in a paper entitled "Improved SAW Chirp Spectrum Analyzer with 80 dB Dynamic Range", published in Proceedings, IEEE Ultrasonics Symposium, 1978, at pages 518–521. The CMC procedure requires a pulse input. Another alternative for spectrum analysis is to use what is known as the prime transform and reference may be made to a paper entitled "A Fast Digital/-SAW Prime Transform Processor" by B. J. Darby et al., published in Proceedings, IEEE Ultrasonics Symposium, 1978, at pages 522–526.

The synthesizer technique of mixing chirp waveforms generated by using SAW technology is described in the paper by J. M. Hannah et al, entitled "Fast Coherent Frequency Hopped Waveform Synthesis Using SAW Devices", published in Proceedings, IEEE Ultrasonics Symposium, 1976, at pages 428–431.

In realising the convolution effected by SAW chirp filter 23, steps may be taken on the filter device or with the aid of a separate device to weight the response for the reduction of time sidelobes. Such techniques are well-known. Weighting can also be applied to the SAW filters in synthesizer to reduce sidelobe responses.

The speed of SAW devices is such that in the apparatus described it should be possible to regenerate signals with a response time of the order of 10 to 200 microseconds. There is no complex switching to establish or banks of filters to maintain in alignment. Advantage also arises in that the apparatus is capable of handling a large number of signals simultaneously both input and output. There is no sweep interruption for each signal to be jammed. SAW devices can also be realised to have large operating bandwidths if required. SAW devices can be constructed to have bandwidths from as low as 1 MHz to in excess of 100 MHz.

Figure 4:
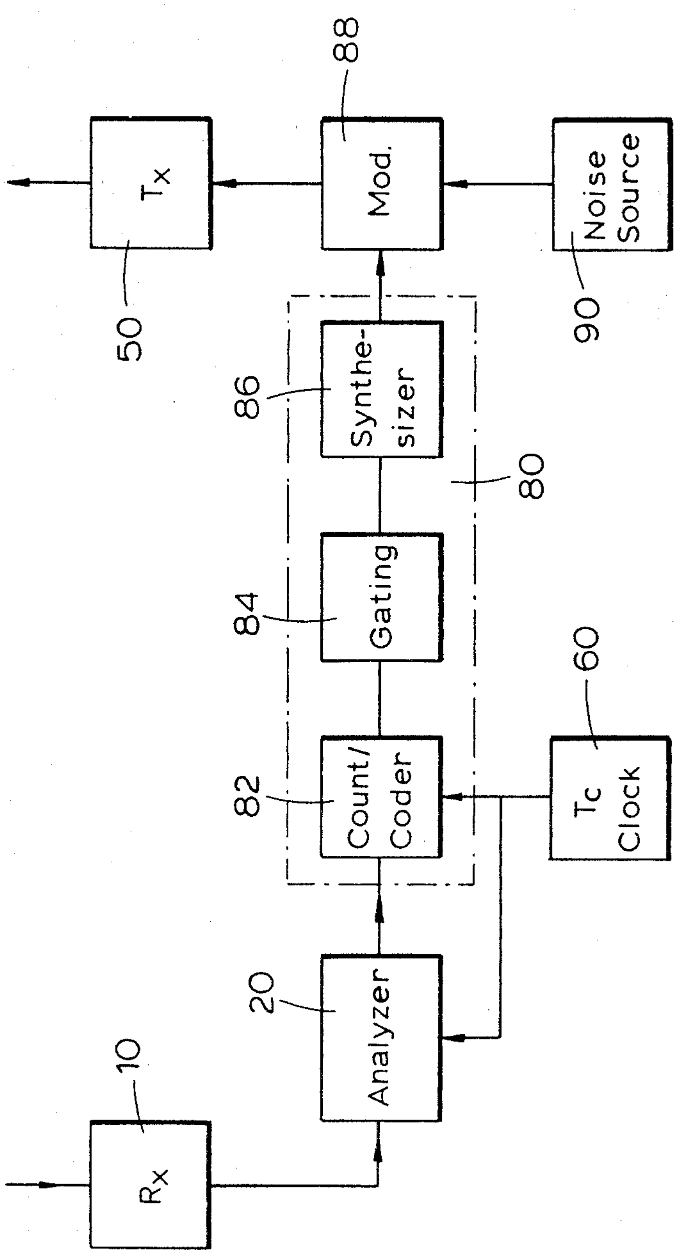
FIG. 4 illustrates a modified form of the apparatus.

FIG. 4 illustrates a modified form of apparatus which might be called "hybrid" in that it uses the same SAW input analyzer but a different form of regenerator circuit.

The apparatus of FIG. 4 has an input receiver circuit 10, a SAW spectrum analyzer circuit 20 and a clock source 60 that correspond to the like units of FIG. 1 and the description of which will not be repeated. For each sweep the analyzer produces its time series of pulses that are applied to a processing and synthesizer ciruit 80. Circuit 80 includes a time-measuring unit 82 that is responsive to each clock pulse and to the series of analyzer pulses produced in response to that clock pulse to produce for each pulse of the series a digital code representing the time of the pulse in relation to the start of the sweep. The codes can be produced with the aid of a fast-running counter each pulse of the analyzer series causing the instantaneous count value to be read out. The frequency-representing codes consisting of n bits are then passed through comparator/gate circuitry 84 which inhibits the transmission of codes corresponding to friendly frequencies. This circuitry may also contain delay stages, e.g. shift registers, to delay the outputting of the codes until after the sample period of the analyzer to provide a "look-through" mode of operation.

Thereafter the codes selected for regeneration are passed in sequence to a fast programmable frequency synthesizer or generator 86 that produces a frequency output in accord with the applied code. The frequency output is then applied to appropriate frequency covnersion/transmit circuitry 50 as before. The resultant time-to-frequency relationship arising from the time-to-code conversion and subsequent code-to-frequency conversion of the unit 80 matches the frequency-to-time characteristic of the analyzer to maintain the same frequency differences among the output signals as among the input signals that gave rise to them.

It will be noted that in this case the synthesizer can only produce one frequency at a time but with less chance of spurious outputs than in the FIG. 1 apparatus. Preferably the synthesizer output is applied to a modulator 88 where it is modulated by a narrow-band noise source 90 to spread its spectrum over a bandwidth equal to the expected information bandwidth. This is not required in the embodiment of FIG. 1 as this embodiment produces pulsed output waveforms which inherently have an expanded output spectrum. It will be appreciated that in the FIG. 4 apparatus the frequency output is stepped with a resolution dependent on the number of bits in the chosen coding. In seeking to interfere with communication channels for example the resolution can be made sufficiently fine to ensure the regenerated output frequency is within the communication channel of the original signal.

What is claimed is:

1. Apparatus for regenerating signals within an input frequency band, comprising:
   (1) a signal analyzer circuit that includes:
      (a) means responsive to a trigger signal to generate a predetermined swept frequency signal;
      (b) a mixer responsive to said swept frequency signal and signals in the input frequency band to provide a corresponding set of swept frequency signals at an intermediate frequency band;
      (c) a convolution filter having a frequency versus time characteristic matching that of the swept frequency signal so as to perform a convolution operation on said set of swept frequency signals to provide a corresponding set of compressed signals that are displaced in time whereby signals in the input frequency band are transformed to time displaced signals in accord with a predetermined frequency-to-time relationship;
   (2) a signal regenerator circuit for receiving a series of time displaced signals from said analyzer circuit to provide a set of frequency signals in accord with a predetermined time-to-frequency relationship that so matches the frequency-to-time relationship of said analyzer circuit that the same frequency differences exist between a set of signals from the signal regenerator circuit as existed between the set of signals that gave rise thereto in the input frequency band of the analyzer circuit; and
   (3) timing means coupled to said analyzer circuit and said signal regenerator circuit to supply thereto signals for triggering said analyzer circuit and providing a time reference for said signal regenerator circuit.

2. Apparatus as claimed in claim 1 in which said means for generating a swept frequency signal and said convolution filter comprise first and second chirp devices respectively, said chirp devices having equal dispersion characteristics.

3. Apparatus as claimed in claim 2 in which said first and second chirp device are surface acoustic wave (SAW) chirp filters.

4. Apparatus as claimed in claim 1 in which said predetermined swept frequency signal has a duration defining a sample period for signals in the input frequency band; and said regenerator circuit comprises delay means for controlling the timing of the set of frequency signals generated from each series of time displaced signals such that the sampling of input signals alternates with the generation of output signals.

5. Apparatus as claimed in claim 4 in which said means for generating a swept frequency signal and said convolution filter each comprises a respective surface acoustic wave (SAW) chirp filter.

6. Apparatus as claimed in claim 1 in which said signal regenerator circuit includes a synthesizer circuit for transforming a series of signals mutually displaced in time to the set of signals mutually displaced in frequency according to said predetermined time-to-frequency relationship; and signal processor means coupling said synthesizer circuit to said analyzer circuit and coupled to said timing means to receive time reference signals therefrom to selectively inhibit the transmission to said synthesizer circuit of time-displaced signals occurring at one or more selected times in a series.

7. Apparatus as claimed in claim 2 in which said signal regenerator circuit comprises:
   a third chirp device coupled to said timing means through a delay device to be activated by a delayed version of each trigger signal for said analyzer circuit and thereby generate a swept frequency signal at a time fixed with respect to each trigger signal;
   a fourth chirp device coupled to said analyzer circuit to receive therefrom, and be activated by each of, a series of time displaced signals in response to each trigger signal, said fourth chirp device having the same magnitude of dispersive slope as said third chirp device and generating a swept frequency signal in response to each activating signal that at least partially co-exists with that from said third chirp device;
   a mixer for mixing the swept frequency signals from said third and fourth chirp devices to provide a set of signals at the mixer output having different but individually constant frequencies; and filter means for selecting said set of mixer output signals as said set of signals mutually displaced in frequency.

8. Apparatus as claimed in claim 7 in which said signal regenerator circuit includes signal processing means coupled to said timing means and coupling said analyzer circuit to said third chirp filter to selectively inhibit the transmission thereto of time displaced signals occurring at one or more selected times in a series.

9. Apparatus as claimed in claim 7 in which each of said first, second, third and fourth chirp devices is a surface acoustic wave (SAW) chirp filter.

10. Apparatus as claimed in claim 1 in which said signal regenerator circuit comprises:

a time-measuring circuit responsive to said time reference signals and to each series of time displaced signals from said analyzer circuit to provide a digital code representing the time of each time displaced signal; and a programmable frequency generator coupled to receive digital codes from said time-measuring means and operable to provide a frequency signal in accord with a digital code received thereby.

11. Apparatus as claimed in claim 10 further comprising signal processing means coupling said programmable frequency generator to said analyzer circuit to selectively inhibit the transmission of one or more digital codes to said frequency generator.

12. Apparatus as claimed in claim 10 in which each of said first and second chirp devices comprise a surface acoustic wave (SAW) chirp filter.

13. Apparatus for regenerating signals within an input frequency band, comprising:

a spectrum analyzer circuit repetitively triggerable to transform on each such triggering a set of signals mutually displaced in frequency within a predetermined frequency band to a corresponding series of signals mutually displaced in time according to a predetermined frequency-to-time relationship;

a synthesizer circuit for transforming a received series of time displaced signals from said analyzer circuit into a set of frequency signals in accord with a predetermined time-to-frequency relationship that so matches the frequency-to-time relationship of said analyzer circuit that the same frequency differences exist between a set of signals from the synthesizer circuit as existed between the set of signals that gave rise thereto in the input frequency band of the analyzer circuit;

timing means coupled to said analyzer circuit and said signal regenerator circuit to supply thereto signals for triggering said analyzer circuit and providing a time reference for said signal regenerator circuit; and signal processor means coupling said synthesizer circuit to said analyzer circuit and coupled to said timing means to receive time reference signals therefrom to selectively inhibit the transmission to said synthesizer circuit of time-displaced signals occurring at one or more selected times in a series.

14. Apparatus as claimed in claim 13 in which said analyzer circuit includes means for providing the series of time displaced signals as a series of pulses.

15. Apparatus as claimed in claim 14 in which said pulse-providing means comprises a threshold detector operable to pass only signals exceeding a predetermined level.

16. Apparatus as claimed in claim 13 in which said synthesizer circuit comprises:

two chirp devices having the same magnitude of dispersive slope a first of which is activated to generate a respective swept frequency signal at a time fixed with respect to each trigger signal applied to said analyzer circuit and the second of which is activated by each of the series of time displaced signals transmitted by said signal processing means to generate a series of swept frequency signals each at least partially co-existing in time with that from said first chirp device;

a mixer for mixing the swept frequency signals from said first and second chirp devices to provide a set of signals at the mixer output having different but individually constant frequencies; and filter means for selecting said set of mixer output signals as said set of signals mutually displaced in frequency.

17. Apparatus as claimed in claim 16 in which said two chirp devices have dispersive slopes of opposite sign and said filter means is arranged to select the sum frequency products of the swept frequencies from said two chirp devices.

18. Apparatus as claimed in claim 16 in which each of said two chirp devices comprises a surface acoustic wave (SAW) chirp filter.

19. Apparatus as claimed in claim 16 in which said signal regenerator circuit includes a time delay device connected to said timing means to receive trigger signals from the analyzer circuit and transmit the delayed trigger signals as time reference signals to activate said first chirp device.

20. Apparatus for regenerating signals within an input frequency band, comprising:

a spectrum analyzer circuit repetitively triggerable to transform on each such triggering a set of signals mutually displaced in frequency within a predetermined frequency band to a corresponding series of signals mutually displaced in time according to a predetermined frequency-to-time relationship;

a signal regenerator circuit for receiving a series of time displaced signals from said analyzer circuit to provide a set of frequency signals in accord with a predetermined time-to-frequency relationship that so matches the frequency-to-time relationship of said analyzer circuit that the same frequency differences exist between a set of signals from the signal regenerator circuit as existed between the set of signals that gave rise thereto in the input frequency band of the analyzer circuit; and timing means coupled to said analyzer circuit and said signal regenerator circuit to supply thereto signals for triggering said analyzer circuit and providing a time reference for said signal regenerator circuit; and said signal regenerator circuit comprising:

a time-measuring circuit responsive to said time reference signals and to each series of time displaced signals from said analyzer circuit to provide a digital code representing the time of each time displaced signal; and a programmable frequency generator coupled to receive digital codes from said time-measuring means and operable to provide a frequency signal in accord with a digital code received thereby.

21. Apparatus as claimed in claim 20 further comprising signal processing means coupling said programmable frequency generator to said analyzer circuit to selectively inhibit the transmission of one or more digital codes to said frequency generator.

* * * * *

UNITED STATES PATENT AND TRADEMARK OFFICE
CERTIFICATE OF CORRECTION

PATENT NO. : 4,357,709

DATED : November 2, 1982

INVENTOR(S) : Michael B. N. Butler; Walter W. Jacobs; Peter M. Grant

It is certified that error appears in the above—identified patent and that said Letters Patent is hereby corrected as shown below:

On the title page,

Correct the Assignee from Racal-Mesl Limited, Scotland to

Racal-Mesl Microwave Limited, Newbridge, Midlothian, Scotland

Signed and Sealed this

*Twenty-fifth* Day of *October 1983*

[SEAL]

*Attest:*

GERALD J. MOSSINGHOFF

*Attesting Officer* *Commissioner of Patents and Trademarks*